June 28, 1927.

E. WILLE

SCREW CUTTER

Filed Nov. 25, 1924

Inventor
Eduard Wille
By Hauff-Harland.
Attorneys

Patented June 28, 1927.

1,633,913

UNITED STATES PATENT OFFICE.

EDUARD WILLE, OF CRONENBERG, GERMANY.

SCREW CUTTER.

Application filed November 25, 1924, Serial No. 752,105, and in Germany September 5, 1924.

This invention relates to screw-thread cutters, and has for its object to provide an improved cutting tool of this kind.

The improved cutting tool of the above mentioned kind according to the invention is characterized herein, that the cutting edges of each pair of teeth located opposite to one another in projection, and adapted to cut the normal thread profile or pitch, are at equal distances from the central axis, while the other teeth which are located at their peripheries upon the circumference of the same circle as the teeth designed for the normal screw-thread profile, are located essentially nearer to the central axis than the latter. Also, each pair of the other teeth may be located, with advantage, at essentially equal distances from the central axis, and also in such a manner that the bases of all the teeth, regarded as one unit, are located upon an ellipse.

The invention is illustrated in the accompanying drawing in which: Fig. 1 shows a section through a tap according to the invention.

Figure 1:
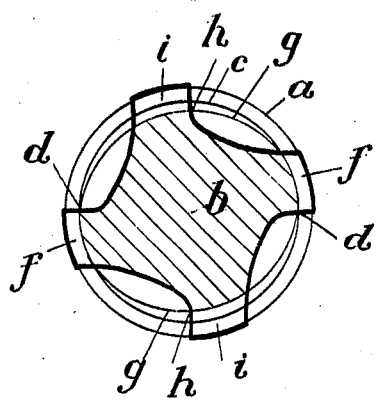

Referring to the drawing, $a$ and $c$ indicate circles concentric round the axis $b$. The circle $a$ determines the positions of the top edges of the teeth $f$ and $i$. The circle $c$ determines the position of the bottom edges $d$ of the teeth $f$, while the bottom edges $h$ of the teeth $i$ are situated on a curve $g$ forming substantially an ellipse $g$.

Figure 2:
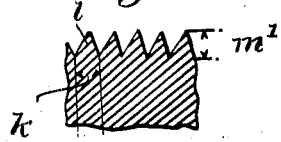
Fig. 2 is a section through a part of teeth $i$ of Fig. 1.
Figure 3:
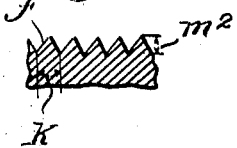
Fig. 3 is a section through a part of teeth $f$ of Fig. 1.

As shown in Fig. 2, the teeth $i$ have the same base $k$ as the teeth $f$ in Fig. 3, but the height $m^1$ of the teeth $i$ is different from the height $m^2$ of the teeth $f$, so that the teeth $i$ are more slender than the teeth $f$.

By such a formation of the screw-thread tap, or the like, the teeth $f$ are made with the normal profile, while the teeth $i$ are relatively longer or more slender, that is, from the same base are higher than the teeth $f$. The teeth $i$ consequently cut essentially only at their periphery, in such a manner that the base of the thread to be cut is sharply finished off, owing to the fact that this base is cut both by the teeth $i$ and also by the teeth $f$. These teeth $i$ leave a certain amount of space for the chippings while the teeth $f$ facilitate an exact cutting out of the normal profile of the screw-thread.

The pressure upon the axis of the screw-thread tap or the like, due to the arrangement of the cutting planes of the teeth $f$ or $i$ transversely to the working direction of the cutter located opposite one another substantially on one and the same diameter is equalized, so that there is no fear of the teeth breaking. It is not necessary that the bases of the teeth should lie exactly upon an ellipse, and particularly this is not necessary upon their entire length. It is however essential that several teeth for determining the normal profile must be provided adjacent to teeth which do not cut the normal profile, but are only located at their periphery upon the same circle as the teeth determining the normal profile.

The arrangement of the teeth upon an ellipse may also be of advantage for the case in which an odd number of teeth is provided. In this case the arrangement of two teeth cutting the normal profile can be so chosen that they are located opposite one another, while the other teeth, which do not cut the completely normal profile, are irregularly distributed over the circumference. A certain amount of adaptation however may be effected in the sense that the teeth cutting the full normal profile are not located upon one and the same diameter of the circle.

I claim:—

1. A screw cutter comprising for each turn of the screw a pair of first teeth, adapted to cut a normal screw thread profile, and a plurality of second teeth, the bases of which being substantially equal to those of the first teeth while the lengths of these second teeth in the direction of the diameter being greater than those of the first teeth.

2. A screw cutter comprising for each turn of the screw a pair of first teeth, adapted to cut a normal screw thread profile, and a plurality of second teeth, the bases of which being substantially equal to those of the first teeth while the lengths of these second teeth in the direction of the diameter being greater than those of the first teeth, the cutting edges of the first and the second teeth being substantially arranged in the projection on the periphery of one and the same circle.

3. A screw cutter comprising for each turn of the screw a pair of first teeth, adapted to cut a normal screw thread profile, and a plurality of second teeth, the bases of which being substantially equal to those of the first teeth while the lengths of these second teeth in the direction of the diameter being greater than those of the first teeth and the bases of all the teeth in projection being arranged substantially upon an ellipse.

4. A screw cutter comprising for each turn of the screw a pair of first teeth, adapted to cut a normal screw thread profile, and a plurality of second teeth, the bases of which being substantially equal to those of the first teeth while the lengths of these second teeth in the direction of the diameter being greater than those of the first teeth and the base of each of the first teeth being arranged in projection at a substantially equal distance from the axis round which the cutter works.

5. A screw cutter comprising for each turn of the screw a pair of first teeth, adapted to cut a normal screw thread profile, and a pair of second teeth, the bases of which being substantially equal to those of the first teeth while the lengths of these second teeth in the direction of the diameter being greater than those of the first teeth and the base of each of the second teeth being arranged in projection at a substantially equal distance from the axis round which the cutter works.

6. A screw cutter comprising for each turn of the screw a pair of first teeth, adapted to cut a normal screw thread profile, and a pair of second teeth, the bases of which being substantially equal to those of the first teeth while the lengths of these second teeth in the direction of the diameter being greater than that of the first teeth.

7. A screw cutter comprising for each turn of the screw a pair of first teeth, adapted to cut a normal screw thread profile, and a pair of second teeth, the bases of which being substantially equal to those of the first teeth while the lengths of these second teeth in the direction of the diameter being greater than that of the first teeth and the bases of the first pair of teeth being arranged in projection at a substantially equal first distance from the axis round which the cutter works and the bases of the second pair of teeth being arranged in projection at a substantially equal second distance from the axis round which the cutter works.

8. A screw cutter comprising for each turn of the screw a pair of first teeth adapted to cut a normal screw thread profile, and a plurality of second teeth more slender than the first ones.

9. A screw cutter comprising for each turn of the screw a pair of first teeth adapted to cut a normal screw thread profile on the said teeth cutting planes transversely to the working direction of the teeth, the said planes being arranged substantially on one and the same diameter of the cutter, and a plurality of second teeth more slender than the first ones.

In testimony whereof I have affixed my signature.

EDUARD WILLE.